US009229780B2

(12) United States Patent
Archer et al.

(10) Patent No.: US 9,229,780 B2
(45) Date of Patent: *Jan. 5, 2016

(54) IDENTIFYING DATA COMMUNICATIONS ALGORITHMS OF ALL OTHER TASKS IN A SINGLE COLLECTIVE OPERATION IN A DISTRIBUTED PROCESSING SYSTEM

(71) Applicant: INTERNATIONAL BUSINESS MACHINES CORPORATION, Armonk, NY (US)

(72) Inventors: Charles J. Archer, Rochester, MN (US); James E. Carey, Rochester, MN (US); Matthew W. Markland, Rochester, MN (US); Philip J. Sanders, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 562 days.

This patent is subject to a terminal disclaimer.

(21) Appl. No.: 13/667,302

(22) Filed: Nov. 2, 2012

(65) Prior Publication Data

US 2013/0060833 A1    Mar. 7, 2013

Related U.S. Application Data

(63) Continuation of application No. 13/185,856, filed on Jul. 19, 2011.

(51) Int. Cl.
*G06F 9/46* (2006.01)
*G06F 9/50* (2006.01)
*G06F 9/54* (2006.01)

(52) U.S. Cl.
CPC ............ *G06F 9/5066* (2013.01); *G06F 9/5072* (2013.01); *G06F 9/546* (2013.01)

(58) Field of Classification Search
None
See application file for complete search history.

(56) References Cited

U.S. PATENT DOCUMENTS

| | | |
|---|---|---|
| 4,860,201 A | 8/1989 | Stolfo et al. |
| 4,910,669 A | 3/1990 | Gorin et al. |
| 5,050,162 A | 9/1991 | Golestani |
| 5,063,562 A | 11/1991 | Barzilai et al. |
| 5,095,444 A | 3/1992 | Motles |
| 5,218,676 A | 6/1993 | Ben-Ayed et al. |
| 5,347,450 A | 9/1994 | Nugent |
| 5,414,839 A | 5/1995 | Joshi |
| 5,446,676 A | 8/1995 | Huang et al. |
| 5,491,691 A | 2/1996 | Shtayer et al. |

(Continued)

OTHER PUBLICATIONS

Office Action, U.S. Appl. No. 12/189,336, Sep. 13, 2012.

(Continued)

*Primary Examiner* — Mengyao Zhe
*Assistant Examiner* — James J Lee
(74) *Attorney, Agent, or Firm* — Edward J. Lenart; Grant A. Johnson; Kennedy Lenart Spraggins LLP

(57) ABSTRACT

Topology mapping in a distributed processing system, the distributed processing system including a plurality of compute nodes, each compute node having a plurality of tasks, each task assigned a unique rank, including: assigning each task to a geometry defining the resources available to the task; selecting, from a list of possible data communications algorithms, one or more algorithms configured for the assigned geometry; and identifying, by each task to all other tasks, the selected data communications algorithms of each task in a single collective operation.

4 Claims, 7 Drawing Sheets

(56) References Cited

U.S. PATENT DOCUMENTS

| | | |
|---|---|---|
| 5,651,099 A | 7/1997 | Konsella |
| 5,815,793 A | 9/1998 | Ferguson |
| 5,826,262 A | 10/1998 | Bui et al. |
| 5,826,265 A | 10/1998 | Van Huben et al. |
| 5,835,482 A | 11/1998 | Allen |
| 5,859,981 A | 1/1999 | Levin et al. |
| 5,862,381 A | 1/1999 | Advani et al. |
| 5,875,190 A | 2/1999 | Law |
| 5,912,893 A | 6/1999 | Rolfe et al. |
| 5,915,099 A | 6/1999 | Takata et al. |
| 5,918,020 A | 6/1999 | Blackard et al. |
| 5,933,425 A | 8/1999 | Iwata |
| 5,937,201 A | 8/1999 | Matsushita et al. |
| 5,953,336 A | 9/1999 | Moore et al. |
| 5,982,771 A | 11/1999 | Caldara et al. |
| 5,995,503 A | 11/1999 | Crawley et al. |
| 5,999,734 A | 12/1999 | Willis et al. |
| 6,006,032 A | 12/1999 | Blandy et al. |
| 6,047,122 A | 4/2000 | Spiller |
| 6,057,839 A | 5/2000 | Advani et al. |
| 6,101,495 A | 8/2000 | Tsuchida et al. |
| 6,115,357 A | 9/2000 | Packer et al. |
| 6,118,777 A | 9/2000 | Sylvain |
| 6,126,331 A | 10/2000 | Komatsu et al. |
| 6,167,490 A | 12/2000 | Levy et al. |
| 6,182,183 B1 | 1/2001 | Wingard et al. |
| 6,253,372 B1 | 6/2001 | Komatsu et al. |
| 6,336,143 B1 | 1/2002 | Diedrich et al. |
| 6,343,339 B1 | 1/2002 | Daynes |
| 6,438,702 B1 | 8/2002 | Hodge |
| 6,490,566 B1 | 12/2002 | Schmidt |
| 6,493,637 B1 | 12/2002 | Steeg |
| 6,563,823 B1 | 5/2003 | Przygienda et al. |
| 6,594,805 B1 | 7/2003 | Tetelbaum et al. |
| 6,600,721 B2 | 7/2003 | Edholm |
| 6,601,098 B1 | 7/2003 | Case et al. |
| 6,633,937 B2 | 10/2003 | Thomson |
| 6,687,247 B1 | 2/2004 | Wilford et al. |
| 6,725,313 B1 | 4/2004 | Wingard et al. |
| 6,742,044 B1 | 5/2004 | Aviani et al. |
| 6,748,413 B1 | 6/2004 | Bournas |
| 6,772,255 B2 | 8/2004 | Daynes |
| 6,775,703 B1 | 8/2004 | Burns et al. |
| 6,836,480 B2 | 12/2004 | Basso et al. |
| 6,839,768 B2 | 1/2005 | Ma et al. |
| 6,839,829 B1 | 1/2005 | Daruwalla et al. |
| 6,894,974 B1 | 5/2005 | Aweya et al. |
| 6,901,052 B2 | 5/2005 | Buskirk et al. |
| 6,952,692 B1 | 10/2005 | Bhattiprolu et al. |
| 6,990,529 B2 | 1/2006 | Yang et al. |
| 7,032,224 B2 | 4/2006 | Kadakia et al. |
| 7,120,712 B2 | 10/2006 | Wingard et al. |
| 7,197,577 B2 | 3/2007 | Nellitheertha |
| 7,216,217 B2 | 5/2007 | Hansen et al. |
| 7,286,471 B2 | 10/2007 | Kloth et al. |
| 7,299,155 B2 | 11/2007 | Ebert et al. |
| 7,301,541 B2 | 11/2007 | Hansen et al. |
| 7,466,652 B2 | 12/2008 | Lau et al. |
| 7,478,138 B2 | 1/2009 | Chang et al. |
| 7,480,298 B2 | 1/2009 | Blackmore et al. |
| 7,480,609 B1 | 1/2009 | Cavanagh et al. |
| 7,509,244 B1 | 3/2009 | Shakeri et al. |
| 7,527,558 B2 | 5/2009 | Lavoie et al. |
| 7,539,209 B2 | 5/2009 | Pelley |
| 7,647,441 B2 | 1/2010 | Wingard et al. |
| 7,684,332 B2 | 3/2010 | Ray et al. |
| 7,738,443 B2 | 6/2010 | Kumar |
| 7,743,382 B2 | 6/2010 | Schumacher et al. |
| 7,813,369 B2 | 10/2010 | Blackmore et al. |
| 7,913,369 B2 | 3/2011 | Gakovic |
| 7,953,085 B2 | 5/2011 | Chang et al. |
| 7,958,183 B2 | 6/2011 | Arimilli et al. |
| 8,041,969 B2 | 10/2011 | Archer et al. |
| 8,055,879 B2 | 11/2011 | Archer et al. |
| 8,087,025 B1 | 12/2011 | Graupner |
| 8,195,152 B1* | 6/2012 | Edwards ............... 455/432.1 |
| 8,565,120 B2 | 10/2013 | Acher et al. |
| 2001/0047458 A1 | 11/2001 | Izuka |
| 2002/0062459 A1 | 5/2002 | Lasserre et al. |
| 2002/0065930 A1 | 5/2002 | Rhodes |
| 2002/0194392 A1 | 12/2002 | Cheng et al. |
| 2003/0004699 A1 | 1/2003 | Choi et al. |
| 2003/0021287 A1 | 1/2003 | Lee et al. |
| 2003/0074142 A1 | 4/2003 | Steeg |
| 2003/0093254 A1 | 5/2003 | Frankel et al. |
| 2003/0093255 A1 | 5/2003 | Freyensee et al. |
| 2004/0001508 A1 | 1/2004 | Zheng et al. |
| 2004/0015494 A1 | 1/2004 | Basso et al. |
| 2004/0098373 A1 | 5/2004 | Bayliss et al. |
| 2004/0107240 A1 | 6/2004 | Zabarski et al. |
| 2004/0111398 A1 | 6/2004 | England et al. |
| 2004/0246897 A1 | 12/2004 | Ma et al. |
| 2004/0255002 A1 | 12/2004 | Kota et al. |
| 2005/0053034 A1 | 3/2005 | Chiueh |
| 2005/0138161 A1 | 6/2005 | McDaniel et al. |
| 2005/0182834 A1 | 8/2005 | Black |
| 2005/0278453 A1 | 12/2005 | Cherkasova |
| 2006/0002424 A1 | 1/2006 | Gadde |
| 2006/0018283 A1 | 1/2006 | Lewis et al. |
| 2006/0059196 A1 | 3/2006 | Sato et al. |
| 2006/0075067 A1 | 4/2006 | Blackmore et al. |
| 2006/0203739 A1 | 9/2006 | Padmanabhan et al. |
| 2006/0292292 A1 | 12/2006 | Brightman et al. |
| 2007/0014316 A1 | 1/2007 | Ryu et al. |
| 2007/0016589 A1 | 1/2007 | Hara et al. |
| 2007/0094429 A1 | 4/2007 | Wingard et al. |
| 2007/0121511 A1 | 5/2007 | Morandin |
| 2007/0179760 A1 | 8/2007 | Smith |
| 2007/0245171 A1* | 10/2007 | Ohly et al. ............... 714/42 |
| 2007/0260746 A1 | 11/2007 | Mirtorabi et al. |
| 2007/0294426 A1 | 12/2007 | Huang et al. |
| 2008/0016249 A1 | 1/2008 | Ellis et al. |
| 2008/0109569 A1 | 5/2008 | Leonard et al. |
| 2008/0126739 A1 | 5/2008 | Archer et al. |
| 2008/0168177 A1 | 7/2008 | Subramaniam |
| 2008/0240115 A1 | 10/2008 | Briscoe et al. |
| 2008/0248747 A1 | 10/2008 | Buckley |
| 2008/0306721 A1 | 12/2008 | Yang |
| 2008/0310350 A1 | 12/2008 | Dykema et al. |
| 2008/0313376 A1 | 12/2008 | Archer et al. |
| 2008/0313661 A1 | 12/2008 | Blocksome et al. |
| 2009/0003344 A1 | 1/2009 | Kumar |
| 2009/0006808 A1 | 1/2009 | Blumrich et al. |
| 2009/0006810 A1 | 1/2009 | Almasi et al. |
| 2009/0037707 A1 | 2/2009 | Blocksome |
| 2009/0043988 A1 | 2/2009 | Archer et al. |
| 2009/0067334 A1 | 3/2009 | Archer et al. |
| 2009/0089328 A1 | 4/2009 | Miller |
| 2009/0092075 A1* | 4/2009 | Corson et al. ............. 370/328 |
| 2009/0113308 A1 | 4/2009 | Almasi et al. |
| 2009/0125604 A1 | 5/2009 | Chang et al. |
| 2009/0129277 A1 | 5/2009 | Supalov et al. |
| 2009/0138892 A1 | 5/2009 | Almasi et al. |
| 2009/0196282 A1 | 8/2009 | Fellman et al. |
| 2009/0201832 A1 | 8/2009 | Brown |
| 2009/0240915 A1* | 9/2009 | Faraj ...................... 712/28 |
| 2009/0271595 A1* | 10/2009 | Barsness et al. ............ 712/229 |
| 2009/0300154 A1 | 12/2009 | Branson et al. |
| 2009/0307703 A1* | 12/2009 | Archer et al. ............. 718/104 |
| 2010/0005189 A1 | 1/2010 | Archer et al. |
| 2010/0017492 A1 | 1/2010 | Reistad |
| 2010/0023631 A1 | 1/2010 | Archer et al. |
| 2010/0037035 A1 | 2/2010 | Archer et al. |
| 2010/0058313 A1 | 3/2010 | Hansmann et al. |
| 2010/0241774 A1 | 9/2010 | Olszewski et al. |
| 2010/0274872 A1 | 10/2010 | Harrang et al. |
| 2010/0287320 A1 | 11/2010 | Querol et al. |
| 2011/0113083 A1* | 5/2011 | Shahar ................... 709/201 |
| 2011/0238949 A1 | 9/2011 | Archer et al. |
| 2011/0258627 A1 | 10/2011 | Faraj et al. |
| 2012/0030370 A1 | 2/2012 | Faraj et al. |
| 2012/0174105 A1 | 7/2012 | Archer et al. |
| 2012/0185230 A1 | 7/2012 | Archer et al. |
| 2012/0185867 A1 | 7/2012 | Archer et al. |

(56) References Cited

U.S. PATENT DOCUMENTS

| | | |
|---|---|---|
| 2012/0185873 A1 | 7/2012 | Archer et al. |
| 2012/0210094 A1 | 8/2012 | Blocksome et al. |
| 2012/0246256 A1 | 9/2012 | Blocksome et al. |
| 2013/0024866 A1 | 1/2013 | Archer et al. |
| 2013/0046844 A1 | 2/2013 | Faraj et al. |
| 2013/0060557 A1 | 3/2013 | Archer et al. |
| 2013/0060833 A1 | 3/2013 | Archer et al. |
| 2013/0061238 A1 | 3/2013 | Archer et al. |
| 2013/0067479 A1 | 3/2013 | Archer et al. |
| 2013/0067483 A1 | 3/2013 | Archer et al. |
| 2013/0067487 A1 | 3/2013 | Faraj et al. |
| 2013/0111482 A1 | 5/2013 | Archer et al. |
| 2013/0124665 A1 | 5/2013 | Blocksome et al. |
| 2013/0160025 A1 | 6/2013 | Faraj et al. |
| 2013/0179620 A1 | 7/2013 | Faraj et al. |

OTHER PUBLICATIONS

Office Action, U.S. Appl. No. 12/748,579, Sep. 19, 2012.
Notice of Allowance, U.S. Appl. No. 12/847,573, Jan. 11, 2012.
Office Action, U.S. Appl. No. 13/007,905, Dec. 28, 2012.
Office Action, U.S. Appl. No. 12/985,075, Nov. 7, 2012.
Office Action, U.S. Appl. No. 13/667,456, Jan. 2, 2013.
Notice of Allowance, U.S. Appl. No. 12/189,336, Mar. 27, 2013.
Office Action, U.S. Appl. No. 13/006,696, Mar. 4, 2013.
Final Office Action, U.S. Appl. No. 13/007,905, Apr. 17, 2013.
Final Office Action, U.S. Appl. No. 12/985,075, Apr. 18, 2013.
Final Office Action, U.S. Appl. No. 13/667,456, Apr. 19, 2013.
Blaise Barney, "Message Passing Interface (MPA)", Jul. 21, 2011, Lawrence Livermore National Laboratory, <web.archive.org/web/20110721045616//computing.llnl.gov/tutorials/mpl/>.
"DeinoMPI—MPI_Comm_split", May 11, 2011, Deino Software, <web.archive.org/web/20110501135905?mpi.deino.net/mpi_functions/MPI_Comm_split.html>.
Office Action, U.S. Appl. No. 13/185,856, May 23, 2013, pp. 1-14.
Final Office Action, U.S. Appl. No. 12/748,579, May 10, 2013, pp. 1-7.
Notice of Allowance, U.S. Appl. No. 12/985,075, Jun. 12, 2013, pp. 1-14.
Office Action, U.S. Appl. No. 13/231,326, Jun. 6, 2013, pp. 1-57.
Office Action, U.S. Appl. No. 13/690,474, Jun. 25, 2013.
Faraj, et al.; "STAR-MPI: Self Tuned Adaptive Routines for MPI Collective Operations", Proceedings of the 20th Annual International Conference on Supercomputing (ICS'06), Jun. 2006, pp. 199-208, ACM New York, USA, DOI: 10.1145/1183401.1183431.
"MPI-2: Extensions to the Message-Passing Interface," Message Passing Interface Forum, Nov. 15, 2003, mpi-forum.cs.uiuc.edu/docs/mpi2-report.pdf, Accessed Nov. 7, 2013, 370 Pages.
"MPI Performance Topics", computing.llnl.gov/tutorials/mpi_performance/, Accessed Jul. 8, 2011, 20 Pages.
Saphir, W., "Message Buffering and its Effect on the Communication Performance of Parallel Computers", Apr. 1994, citeseerx.ist.psu.edu/viewdoc/download?doi=10.1.1.128.5359&rep=rep1&type=pdf, pp. 1-20.
"Derived Datatypes with MPI", static.msi.umn.edu/tutorial/scicomp/general/MPI/content6.html, Accessed Jul. 11, 2011, 10 Pages.
Willis, J., et al., "MinSim: Optimized, Compiled VHDL Simulation Using Networked & Parallel Computers", Proceedings of Fall 1993 VHDL International User's Forum, Fall 1993, www.eda.org/VIUF_proc/Fall93/abstract_fall93.html#WILLIS93A, Accessed Nov. 7, 2013, pp. 137-144.
Almasi, G., et al. "Optimization of MPI Collective Communication on BlueGene/L Systems", ICS'05, Jun. 20-22, 2005, pp. 253-262, ACM, Boston, MA, USA.
Chan, E., et al. "Collective Communication on Architectures that Support Simultaneous Communication over Multiple links", PPoPP'06, Mar. 29-31, 2006, pp. 2-11, ACM, New York, New York, USA.

Huang, S., et al., "DZB: MPI One-sided Exploitation of LAPI APIs Component Design", Communication Protocols & Application Tools Development, Mar. 16, 2006, pp. 1-70, IBM Corporation Poughkeepsie, NY, USA.
Weizhen, M. et al., "One-To-All Personalized Communication in Torus Networks", PDCn'07 Proceedings of the 25th IASTED International Multi-Conference: parallel and distributed computing and networks, Innsbruck, Austria, Year: 2007 (Month Unknown), pp. 291-296, ACTA Press Anaheim, CA, USA.
Sottile, M., et al., "Performance analysis of parallel programs via message-passing graph traversal", Feb. 25, 2006, Proc. 20th IEEE Int'l Parallel and Distributed Processing Symp. (IPDPS), Conference Date: Apr. 25-29, 2006, pp. 1-29, Los Alamos Nat. Lab., NM, USA. URL: smartech.gatech.edu/bitstream/handle/1853/14424/GT-CSE-06-10.pdf.
Stankovic, N., et al., "Visual Programming for Message-Passing Systems", International Journal of Software Engineering and Knowledge Engineering, (1999), (Month Unknown), 25 Pages, vol. 9, URL: citeseerx.ist.psu.edu/viewdoc/summary?doi=10.1.1.18.4673.
"DeinoMPI—MPI_Comm_split", May 11, 2011, Deino Software, web.archive.org/web/20110501135905/http://mpi.deino.net/mpi_functions/MPI_Comm_split.html, Accessed May 30, 2013, 4 Pages.
Barney, B., "Message Passing Interface (MPI)", Jul. 21, 2011, Lawrence Livermore National Laboratory, web.archive.org/web/20110721045616/https://computing.llnl.gov/tutorials/mpi/, Accessed Nov. 7, 2013, 31 Pages.
Faraj, A., et al., "STAR-MPI: Self Tuned Adaptive Routines for MPI Collective Operations", Proceedings of the 20th Annual International Conference on Supercomputing (ICS'06), Jun. 2006, pp. 199-208, ACM, New York, New York, USA, DOI: 10.1145/1183401.1183431.
Ribler, R., et al., "The Autopilot performance-directed adaptive control system," Future Generations Computer Systems, Sep. 1, 2001, pp. 175-187, vol. 18, No. 1, Elsevier Science Publications, Amsterdam, NL.
Zhang, Y., et al., "Automatic Performance Tuning for J2EE Application Server Systems," Lecture Notes in Computer Science, Year: 2005, (Month Unknown), pp. 520-527, vol. 3806, Springer Berlin Heidelberg.
Chung, I-Hsin, et al., "Automated Cluster-Based Web Service Performance Tuning," Proceedings of the 13th IEEE International Symposium on High Performance Distributed Computing, 2004, Honolulu, HI, USA, Jun. 4-6, 2004, pp. 36-44, Piscataway, NJ, USA.
Hondroudakis, A., et al., "An Empirically Derived Framework for Classifying Parallel Program Performance Tuning Problems," Proceedings of the Sigmetrics Symposium on Parallel and Distributed Tools, SPOT 1998, Welches, OR, Aug. 3-4, 1998. Sigmetrics Symposium on Parallel and Distributed Tools, Aug. 3, 1998, pp. 112-123, vol. SYMP 2, New York, NY, US, ACM.
Gara, A., et al., "Overview of the Blue Gene/L System Architecture," IBM Journal of Research & Development, Mar./May 2005, pp. 195-211, vol. 49, No. 2/3, IBM, New York, USA.
Adiga, N.R., et al., "Blue Gene/L Torus Interconnection Network." IBM Journal of Research & Development, Mar./May 2005, pp. 265-276, vol. 49, No. 2/3, IBM, New York, USA.
Barnett, M. et al., "Broadcasting on Meshes With Worm-Hole Routing," Second Revised Version, Dec. 1995, pp. 1-22, University of Texas, Department of Computer Sciences.
Faraj, A., et al. "MPI Collective Communications on the Blue Gene/P Supercomputer: Algorithms and Optimizations", 17th IEEE Symposium on High Performance Interconnects, New York, NY, Aug. 25-27, 2009, pp. 63-72, IEEE.
Faraj, A., et al. "A Study of Process Arrival Patterns for MPI Collective Operations", International Journal of Parallel Programming, Jan. 10, 2008, pp. 1-28, Springer (Online).
Faraj, A., et al. "Automatic Generation and Tuning of MPI Collective Communication Routines", ICS'05, Jun. 20-22, 2005, pp. 393-402, Boston, MA, USA. ACM.
Gropp1, "Tutorial on MPI: The Message-Passing Interface", Argonne National Laboratory, Apr. 23, 2009, URL: web.archive.org/web/20090423041649/http://www.mcs.anl.gov/research/projects/mpi/tutorial/gropp/node82.html.

(56) References Cited

OTHER PUBLICATIONS

Gropp2, "Tutorial on MPI: The Message-Passing Interface", Argonne National Laboratory, Apr. 23, 2009, URL: web.archive.org/web/20090423035309/http://www.mcs.anl.gov/research/projects/mpi/tutorial/gropp/node81.html.

Weed, "Message Passing Programming with MPI—Overview and Function Description", Mississippi State University, Jul. 1999, 124 pages.

Wattenhofer, "Principles of Distributed Computing", Apr. 2005, 5 pages, Distributed Computing Group, Zurich.

Wikipedia, "Graphical user interface", Mar. 2007, 5 pages, Wikipedia.org (online publication), URL: en.wikipedia.org/wiki/Graphical_user_interface.

Vadhiyar et al., "Performance Modeling for Self Adapting Collective Communications for MPI", Los Alamos Computer Science Institute (LACSI) Symposium, Oct. 2001, 15 pages, LACSI, Rice University, Houston TX.

Final Office Action, U.S. Appl. No. 11/924,934, May 22, 2014, pp. 1-20.

Notice of Allowance, U.S. Appl. No. 13/663,545, Jul. 16, 2014, pp. 1-22.

\* cited by examiner

US 9,229,780 B2

IDENTIFYING DATA COMMUNICATIONS ALGORITHMS OF ALL OTHER TASKS IN A SINGLE COLLECTIVE OPERATION IN A DISTRIBUTED PROCESSING SYSTEM

CROSS-REFERENCE TO RELATED APPLICATION

This application is a continuation application of and claims priority from U.S. patent application Ser. No. 13/185,856, filed on Jul. 19, 2011.

BACKGROUND OF THE INVENTION

1. Field of the Invention

The field of the invention is data processing, or, more specifically, methods, apparatus, and products for topology mapping in a distributed processing system.

2. Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems can include multiple computing nodes. In a large multi-node system, each node has limited resources that can be used for inter-node communications. These resources are of different types and can have different algorithms associated with them. While a node knows what resources it does and does not have available, the node needs to know what resources are available via other nodes in the computing system, and how to communicate with the other nodes in the computing system.

SUMMARY OF THE INVENTION

Topology mapping in a distributed processing system, the distributed processing system including a plurality of compute nodes, each compute node having a plurality of tasks, each task assigned a unique rank, including: assigning each task to a geometry defining the resources available to the task; selecting, from a list of possible data communications algorithms, one or more algorithms configured for the assigned geometry; and identifying, by each task to all other tasks, the selected data communications algorithms of each task in a single collective operation.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
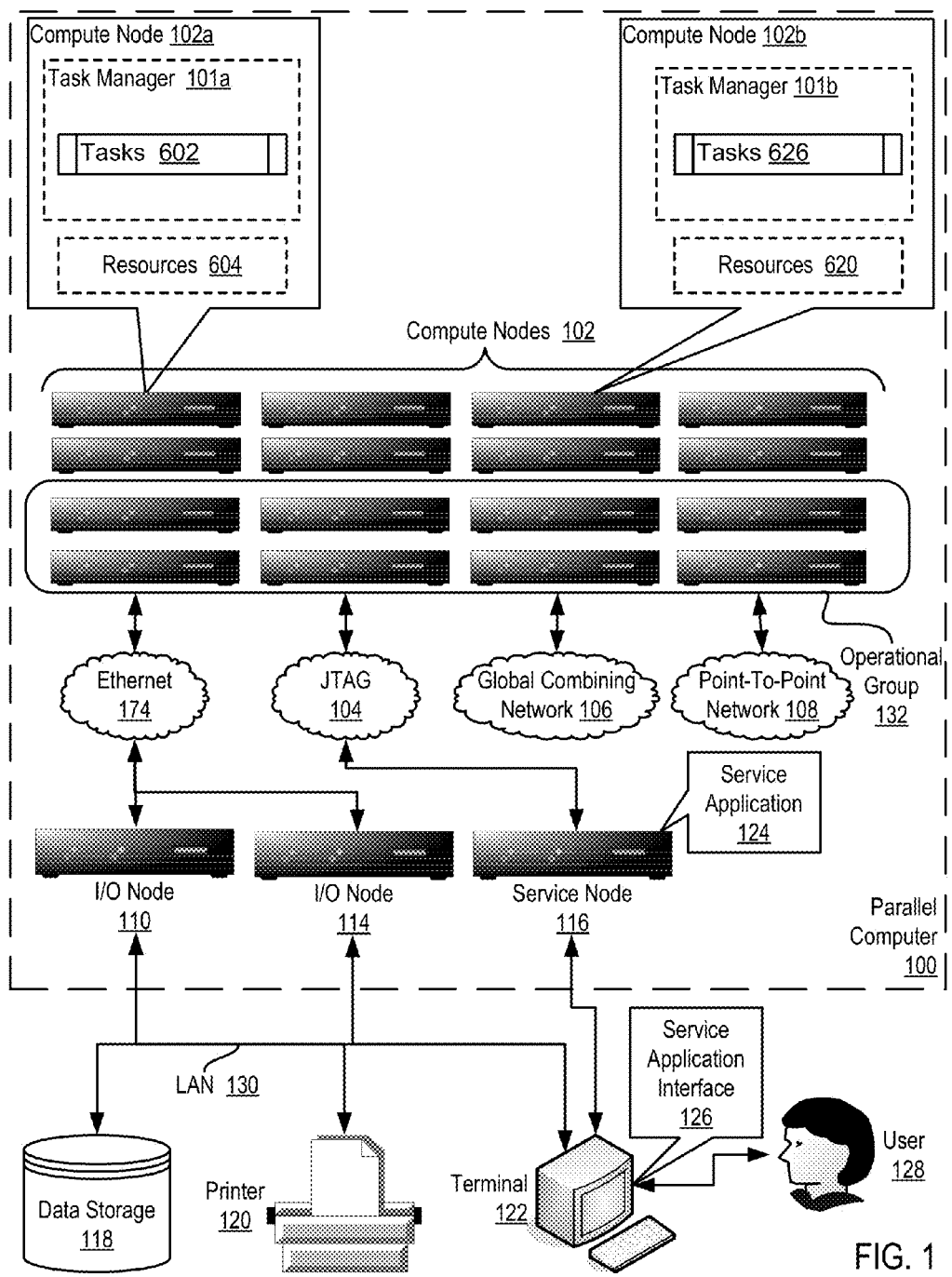
FIG. 1 sets forth example apparatus for topology mapping in a distributed processing system according to embodiments of the present invention.

Exemplary methods, apparatus, and products for topology mapping in a distributed processing system in accordance with the present invention are described with reference to the accompanying drawings, beginning with FIG. 1. FIG. 1 sets forth example apparatus for topology mapping in a distributed processing system according to embodiments of the present invention. The apparatus of FIG. 1 includes a parallel computer (100), non-volatile memory for the computer in the form of a data storage device (118), an output device for the computer in the form of a printer (120), and an input/output device for the computer in the form of a computer terminal (122). The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for topology mapping in a distributed processing system according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following predefined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for topology mapping in a distributed processing system such as a parallel computer (100). Such a parallel computer (100) is typically composed of many compute nodes, but for ease of explanation two of the compute nodes in this example are referenced in particular, compute node (102a) and compute node (102b). In the example of FIG. 1, each compute node (102a, 102b) includes a plurality of tasks (602, 626). In the example of FIG. 1, each task (602, 626) represents the execution of a module of computer program instructions. Each task (602, 626) is assigned a unique rank, such that a particular task can be identified by its unique rank. In the example of FIG. 1, each compute node (102a, 102b) includes resources (604, 620) that may be made available to particular task that is executing on the compute node. Examples of such resources (604, 620) include computer memory that may be made available to a task, a computer processor that may be made available to a task, and so on.

In the example of FIG. 1, each task (602, 626) is assigned to a geometry defining the resources available to the task. In the example of FIG. 1, each task (602, 626) is assigned to a geometry by a task manager (101a, 101b), a module of computer program instructions for monitoring the operation of tasks (602, 626), monitoring the usage of resources (604, 620), initiating task-related communications between compute nodes (102a, 102b), and so on. In the example of FIG. 1, a geometry represents a collection of compute nodes whose resources are available to a particular task that is assigned to the geometry. For example, a first set of compute nodes (102a, 102b) may represent a first geometry and a second set of compute nodes may represent a second geometry. Because each compute node may include different resources, each geometry may therefore include a different set of resources. As such, assigning a particular task to a particular geometry defines the resources that available to the task in the sense that a task can only use the resources that are available on the collection of compute nodes that form the geometry.

In the example of FIG. 1, the task manager (101a, 101b) may select, from a list of possible data communications algorithms, one or more algorithms configured for the assigned geometry. As described above, a geometry represents a collection of compute nodes whose resources are available to a particular task that is assigned to the geometry. Because each compute node in the geometry may include distinct data communications abilities, the communications algorithms that are available to each compute node in the geometry may also be different. For example, some compute nodes may be connected to different data communications networks, some compute nodes may support different data communications protocols, some compute nodes may support different collective operations, and so on. As such, it may be necessary to identify and select a data communications algorithm that is supported by each compute node in a particular geometry to facilitate data communications between the compute nodes in the particular geometry.

In the example of FIG. 1, the task manager (101a, 101b) may also identify, to any other task manager, the selected data communications algorithms of each task in a single collective operation. Identifying the selected data communications algorithms of each task in a single collective operation may be carried out, for example, by broadcasting the data communications algorithms that are supported by the compute node that a task is assigned to, along with the unique rank of the task, to all other compute nodes in the parallel computer (100). In the example of FIG. 1, broadcasting the data communications algorithms that are supported by the compute node that a task is assigned to, along with the unique rank of the task, to all other compute nodes in the parallel computer (100) enables each compute node in the parallel computer (100) to learn more about the other compute nodes in the parallel computer (100) such that each compute node has topological information describing its environment.

The arrangement of nodes, networks, and I/O devices making up the example apparatus illustrated in FIG. 1 are for explanation only, not for limitation of the present invention. Apparatus capable of topology mapping in a distributed processing system according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers capable of topology mapping in a distributed processing system according to embodiments of the present invention sometimes include thousands of compute nodes. In addition to Ethernet (174) and JTAG (104), networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Topology mapping in a distributed processing system according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in a parallel computer capable of topology mapping in a distributed processing system according to embodiments of the present invention. The compute node (102) of FIG. 2 includes a plurality of processing cores (165) as well as RAM (156). The processing cores (165) of FIG. 2 may be configured on one or more integrated circuit dies.

Processing cores (165) are connected to RAM (156) through a high-speed memory bus (155) and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 2:
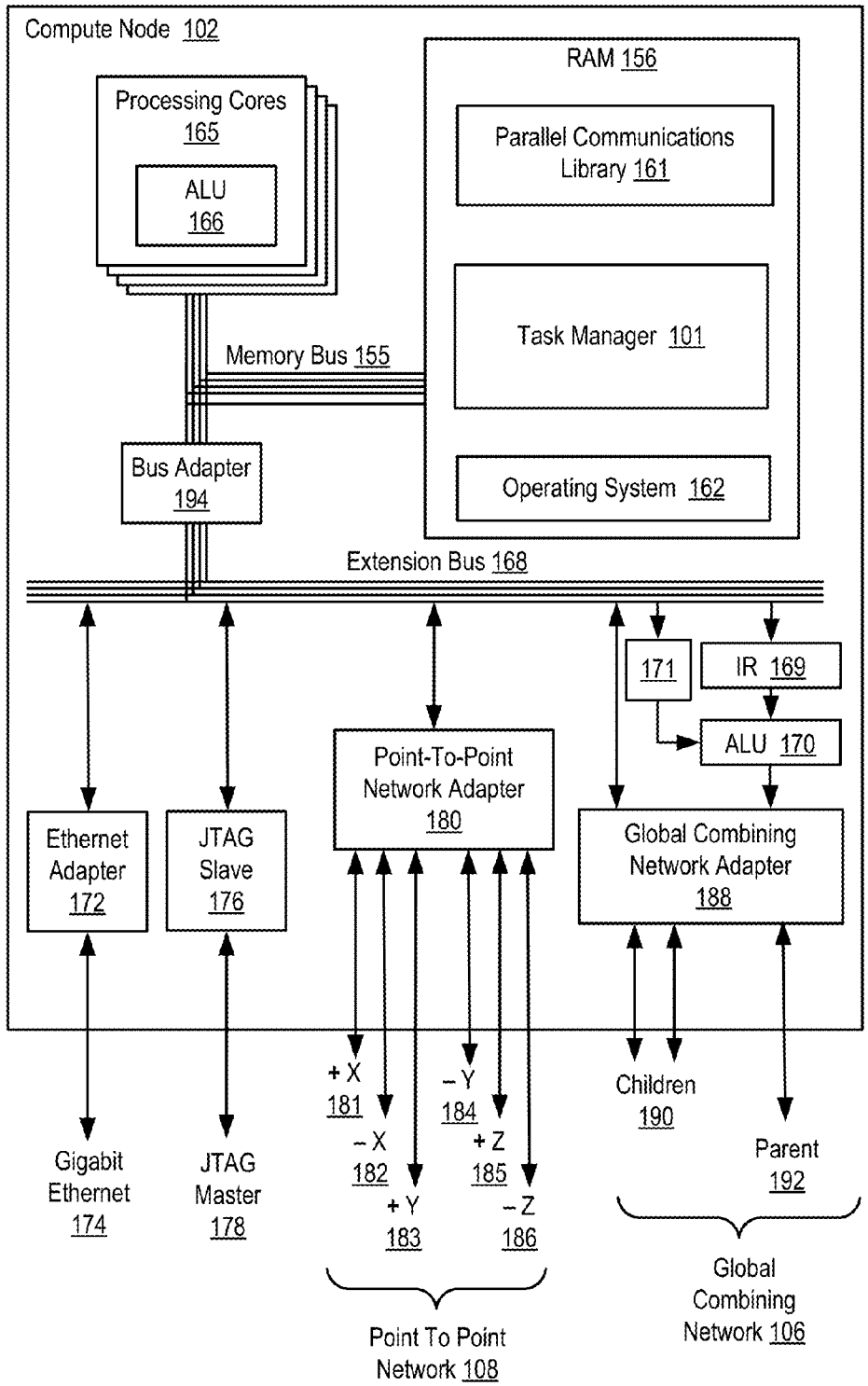
FIG. 2 sets forth a block diagram of an example compute node useful in a parallel computer capable of topology mapping in a distributed processing system according to embodiments of the present invention.

In the example of FIG. 2, a task manager (101) is also stored in RAM (156). In the example of FIG. 2, tasks executing on the compute node (102) are assigned to a geometry by the task manager (101), which is a module of computer program instructions for monitoring the operation of tasks, monitoring the usage of resources on a compute node (102), initiating task-related communications between compute nodes, and so on. In the example of FIG. 2, a geometry represents a collection of compute nodes whose resources are available to a particular task that is assigned to the geometry. For example, a first set of compute nodes may represent a first geometry and a second set of compute nodes may represent a second geometry. Because each compute node may include different resources, each geometry may therefore include a different set of resources. As such, assigning a particular task to a particular geometry defines the resources that available to the task in the sense that a task can only use the resources that are available on the collection of compute nodes that form the geometry.

In the example of FIG. 2, the task manager (101) may select, from a list of possible data communications algorithms, one or more algorithms configured for the assigned geometry. As described above, a geometry represents a collection of compute nodes whose resources are available to a particular task that is assigned to the geometry. Because each compute node in the geometry may include distinct data communications abilities, the communications algorithms that are available to each compute node in the geometry may also be different. For example, some compute nodes may be connected to different data communications networks, some compute nodes may support different data communications protocols, some compute nodes may support different collective operations, and so on. As such, it may be necessary to identify and select a data communications algorithm that is supported by each compute node in a particular geometry to facilitate data communications between the compute nodes in the particular geometry.

In the example of FIG. 1, the task manager (101) may also identify, to any other task manager, the selected data communications algorithms of each task in a single collective operation. Identifying the selected data communications algorithms of each task in a single collective operation may be carried out, for example, by broadcasting the data communications algorithms that are supported by the compute node that a task is assigned to, along with the unique rank of the task, to all other compute nodes in the parallel computer. In the example of FIG. 1, broadcasting the data communications algorithms that are supported by the compute node that a task is assigned to, along with the unique rank of the task, to all other compute nodes in the parallel computer enables each compute node in the parallel computer to learn more about the other compute nodes in the parallel computer such that each compute node has topological information describing its environment.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus useful for topology mapping in a distributed processing system include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems for topology mapping in a distributed processing system according to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point- To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
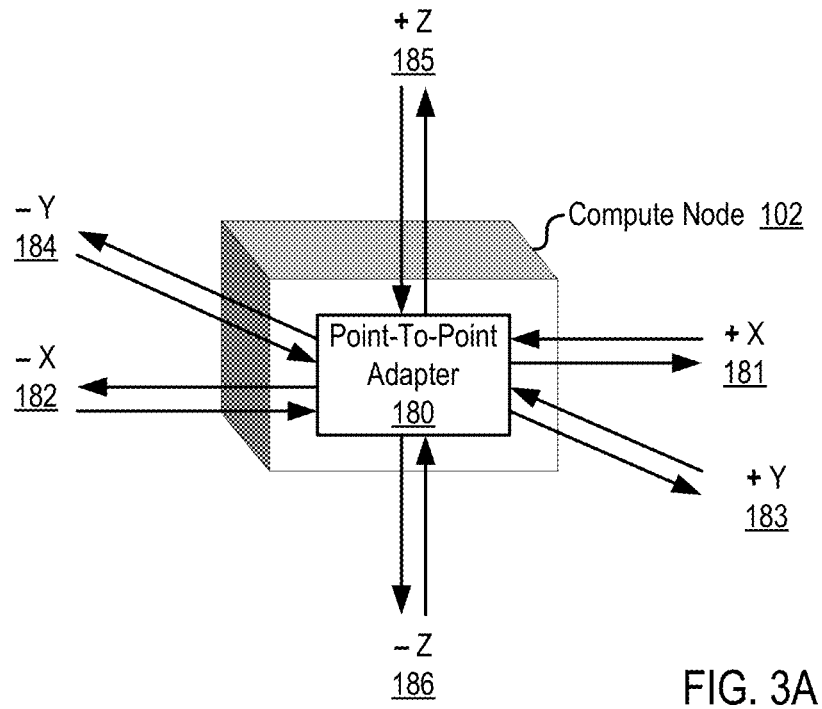
FIG. 3A sets forth a block diagram of an example Point-To-Point Adapter useful in systems for topology mapping in a distributed processing system according to embodiments of the present invention.

For further explanation, FIG. 3A sets forth a block diagram of an example Point-To-Point Adapter (180) useful in systems for topology mapping in a distributed processing system according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
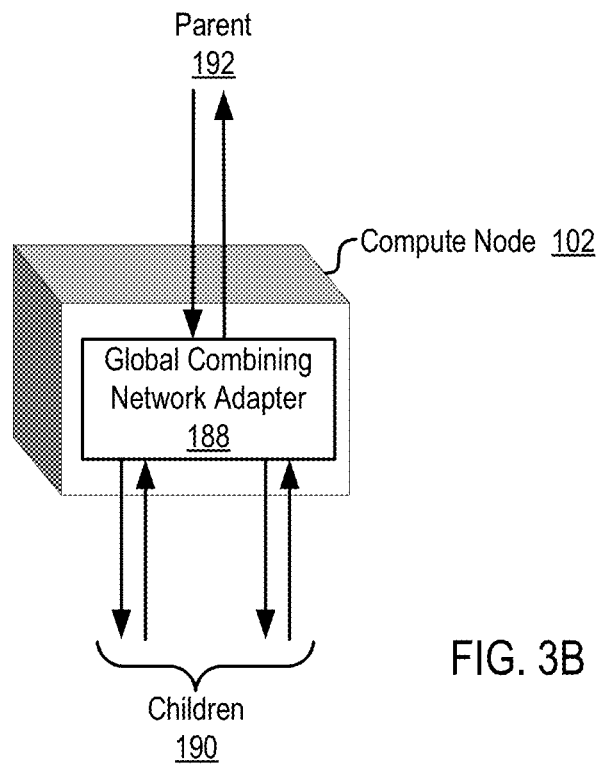
FIG. 3B sets forth a block diagram of an example Global Combining Network Adapter useful in systems for topology mapping in a distributed processing system according to embodiments of the present invention.

For further explanation, FIG. 3B sets forth a block diagram of an example Global Combining Network Adapter (188) useful in systems for topology mapping in a distributed processing system according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
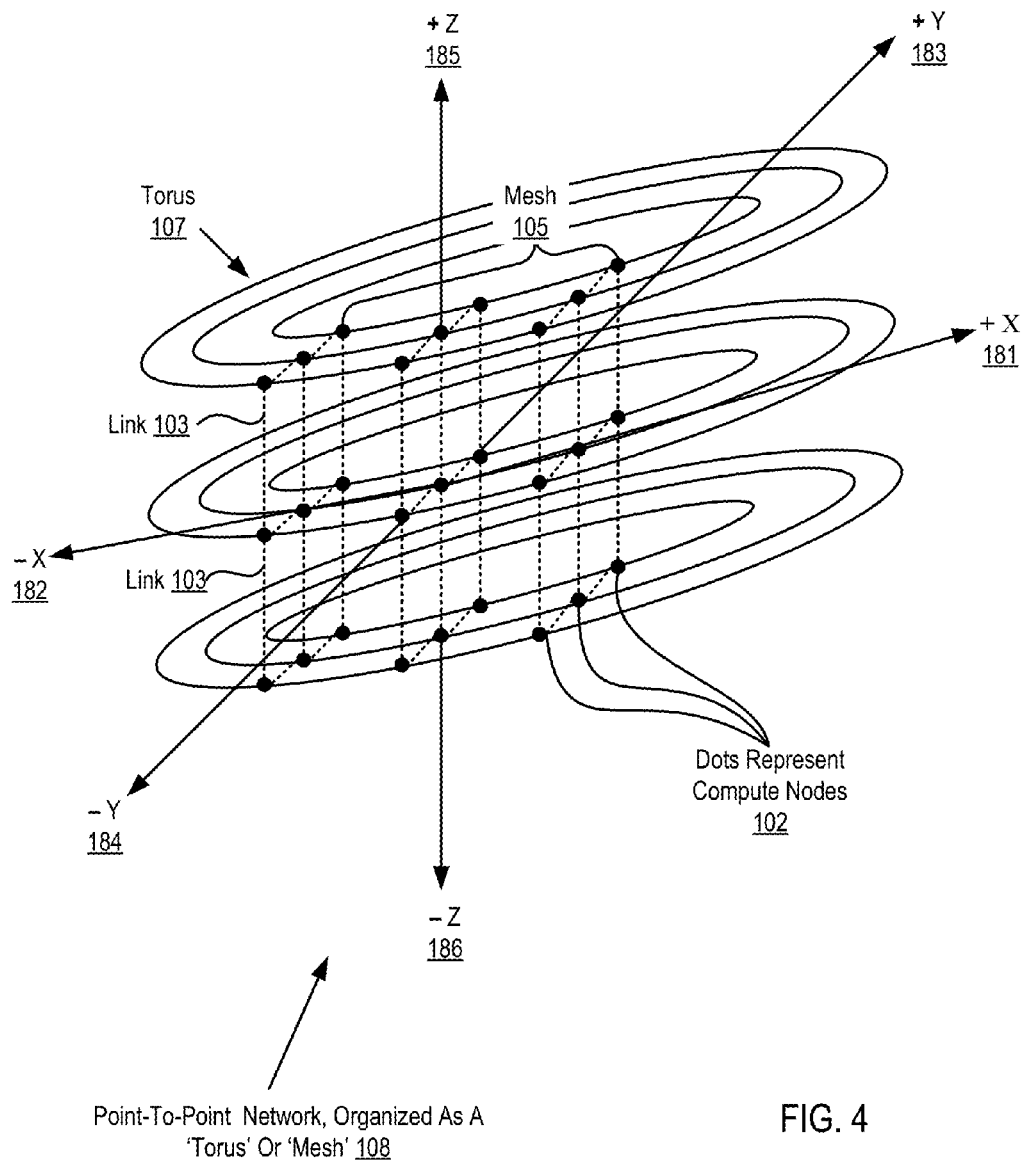
FIG. 4 sets forth a line drawing illustrating an example data communications network optimized for point-to-point operations useful in systems capable of topology mapping in a distributed processing system according to embodiments of the present invention.

For further explanation, FIG. 4 sets forth a line drawing illustrating an example data communications network (108) optimized for point-to-point operations useful in systems capable of topology mapping in a distributed processing system according to embodiments of the present invention. In the example of FIG. 4, dots represent compute nodes (102) of a parallel computer, and the dotted lines between the dots represent data communications links (103) between compute nodes.

The data communications links are implemented with point-to-point data communications adapters similar to the one illustrated for example in FIG. 3A, with data communications links on three axis, x, y, and z, and to and from in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in topology mapping in a distributed processing system in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in topology mapping in a distributed processing system in accordance with embodiments of the present invention may in facet be implemented in two dimensions, four dimensions, five dimensions, and so on. Several supercomputers now use five dimensional mesh or torus networks, including, for example, IBM's Blue Gene Q™.

Figure 5:
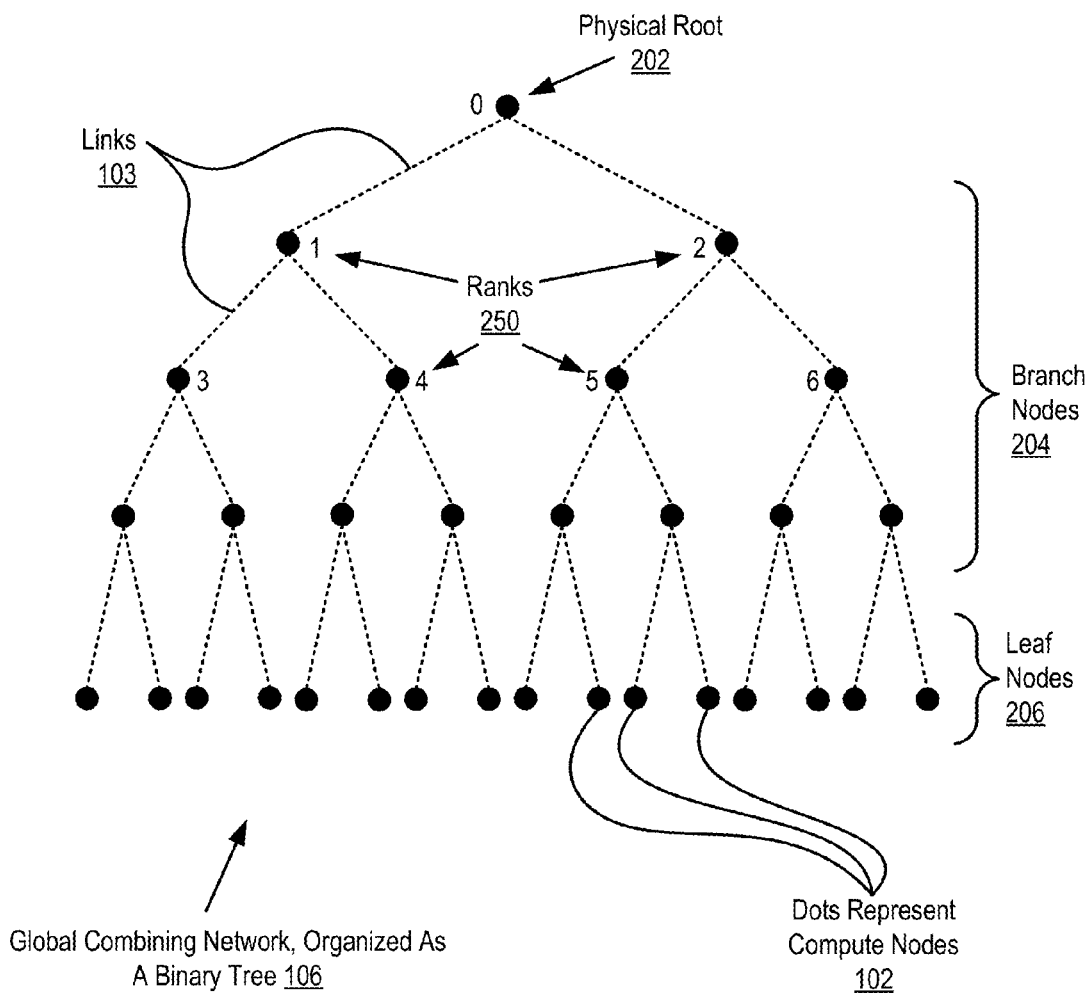
FIG. 5 sets forth a line drawing illustrating an example global combining network useful in systems capable of topology mapping in a distributed processing system according to embodiments of the present invention.

For further explanation, FIG. 5 sets forth a line drawing illustrating an example global combining network (106) useful in systems capable of topology mapping in a distributed processing system according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in topology mapping in a distributed processing system in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
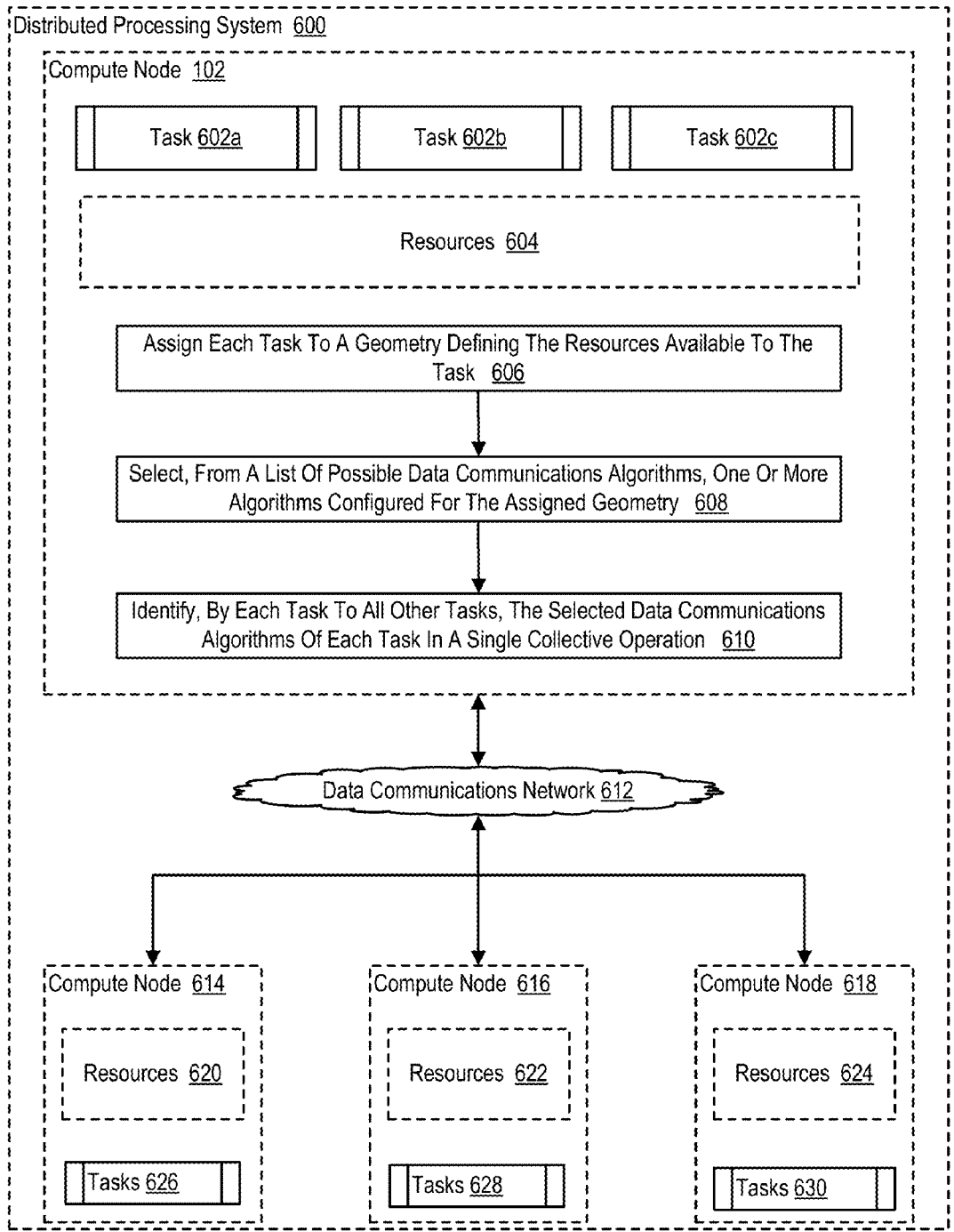
FIG. 6 sets forth a flow chart illustrating an example method for topology mapping in a distributed processing system according to embodiments of the present invention.

For further explanation, FIG. 6 sets forth a flow chart illustrating an example method for topology mapping in a distributed processing system (600) according to embodiments of the present invention. The distributed processing system (600) of FIG. 6 includes a plurality of compute nodes (102, 614, 616, 620). In the example of FIG. 6, each compute node (102, 614, 616, 620) includes a plurality of tasks (602a, 602b, 602c, 626, 628, 630). In the example of FIG. 6, each task (602a, 602b, 602c, 626, 628, 630) represents the execution of a module of computer program instructions. In the example of FIG. 6, each task (602a, 602b, 602c, 626, 628, 630) is assigned a unique rank, such that a particular task can be identified by its unique rank. In the example of FIG. 6, each compute node (102, 614, 616, 618) includes resources (604, 620, 622, 624) that may be made available to particular task that is executing on the compute node. Examples of such resources (604, 620, 622, 624) include computer memory that may be made available to a task, a computer processor that may be made available to a task, and so on.

The example of FIG. 6 includes assigning (606) each task (602a, 602b, 602c, 626, 628, 630) to a geometry defining the resources available to the task. In the example of FIG. 6, a geometry represents a collection of compute nodes whose resources are available to a particular task that is assigned to the geometry. For example, a first set of compute nodes (102, 614, 616) may represent a first geometry and a second set of compute nodes (102, 616, 618) may represent a second geometry. Because each compute node may include different resources, each geometry may therefore include a different set of resources. As such, assigning (606) a particular task to a particular geometry (602a, 602b, 602c, 626, 628, 630) defines the resources that are available to the task in the sense that a task can only use the resources that are available on the collection of compute nodes that form the geometry.

The example of FIG. 6 also includes selecting (608), from a list of possible data communications algorithms, one or more algorithms configured for the assigned geometry. As described above, a geometry represents a collection of compute nodes whose resources are available to a particular task that is assigned to the geometry. Because each compute node in the geometry may include distinct data communications abilities, the communications algorithms that are available to each compute node in the geometry may also be different. For example, some compute nodes may be connected to different data communications networks (e.g., one node is connected to a point-to-point torus network while another node is connected to a global combining network organized as a tree), some compute nodes may support different data communications protocols, some compute nodes may support different collective operations, and so on. As such, it may be necessary to identify and select (608) a data communications algorithm that is supported by each compute node in a particular geometry to facilitate data communications between the compute nodes in the particular geometry.

The example of FIG. 6 also includes identifying (610), by each task to all other tasks, the selected data communications algorithms of each task in a single collective operation. In the example of FIG. 6, identifying (610), by each task to all other tasks, the selected data communications algorithms of each task in a single collective operation may be carried out, for example, by broadcasting the data communications algorithms that are supported by the compute node that a task is assigned to, along with the unique rank of the task, to all other compute nodes in the distributed processing system (600). In the example of FIG. 6, by broadcasting the data communications algorithms that are supported by the compute node that a task is assigned to, along with the unique rank of the task, to all other compute nodes in the distributed processing system (600) enables each compute node in the distributed processing system (600) to learn more about the other compute nodes in the distributed processing system (600) such that each compute node has topological information describing its environment.

Figure 7:
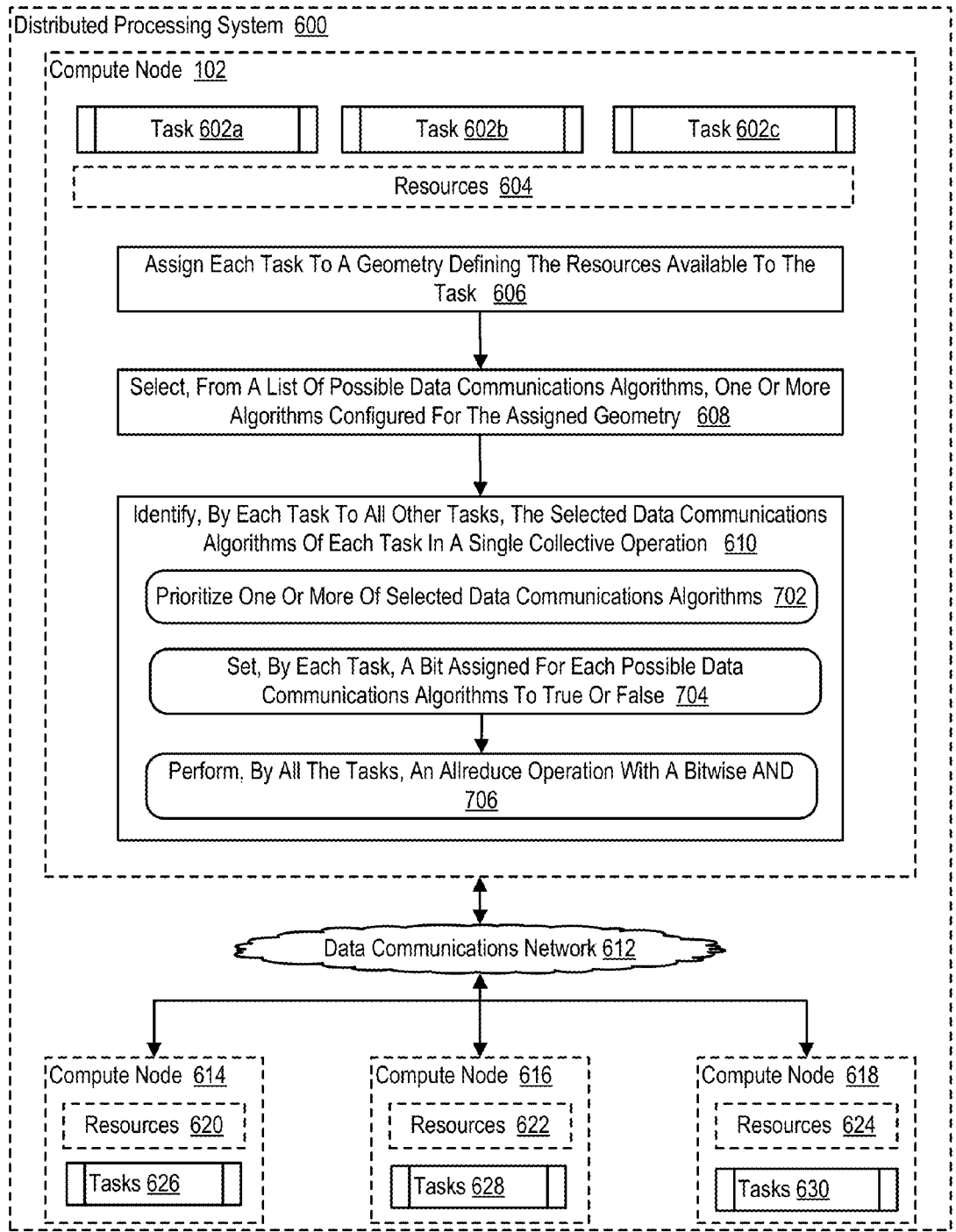
FIG. 7 sets forth a flow chart illustrating an example method for topology mapping in a distributed processing system according to embodiments of the present invention.

For further explanation, FIG. 7 sets forth a flow chart illustrating an example method for topology mapping in a distributed processing system (600) according to embodiments of the present invention. The example method of FIG. 7 is similar to the example method of FIG. 6 as it also includes: assigning (606) each task (602a, 602b, 602c, 626, 628, 630) to a geometry defining the resources (604, 620, 622, 624) available to the task; selecting (608), from a list of possible data communications algorithms, one or more algorithms configured for the assigned geometry; and identifying (610), by each task to all other tasks, the selected data communications algorithms of each task in a single collective operation.

In the example of FIG. 7, identifying (610), by each task to all other tasks, the selected data communications algorithms of each task in a single collective operation can include setting (704), by each task, a bit assigned for each possible data communications algorithms to true or false. In the example of FIG. 6, each task may utilize a predefined data structure consisting of a predetermined number of bits for identifying (610) the selected data communications algorithms that are available for a particular task. For example, the value in a first bit may indicate whether the compute node that a task is assigned to is capable of data communications over a point-to-point torus network, a second bit may indicate whether the compute node that a task is assigned to is capable of data communications over a global combining network, a third bit may indicate whether the compute node that a task is assigned to is capable of data communications using IP as a communications protocol, and so on. In such an example, each respective bit in the predefined data structure may be set to identify the particular data communications algorithms that are available for a particular task. As such, setting the value of a particular bit to '1' may indicate that a particular data communications algorithm is available to a particular task and setting the value to '0' may indicate that a particular data communications algorithm is not available to the particular task.

In the example of FIG. 7, identifying (610), by each task to all other tasks, the selected data communications algorithms of each task in a single collective operation can include performing (706), by all the tasks, an allreduce operation with a bitwise AND. In the example of FIG. 3, an allreduce operation with a bitwise AND is performed (706) on the predefined data structure consisting of a predetermined number of bits for identifying (610) the selected data communications algorithms that are available to each task. As such, bits in the resultant data from performing (706) an allreduce operation with a bitwise AND will only have a value of '1,' indicating that a particular data communications algorithm is available to each of the tasks in a geometry, when a particular data communications algorithm is available to all of the tasks in a geometry.

Consider an example in which the predefined data structure consisting of a predetermined number of bits for identifying (610) the selected data communications algorithms that are available to each task is a 4-bit value. The first bit can indicate whether a node is capable of data communications over a point-to-point torus network, the second bit can indicate whether the compute node is capable of data communications over a global combining network, the third bit can indicate whether the compute node is capable of data communications using IP as a communications protocol, and the fourth bit can indicate whether the compute node is capable of data communications over an Ethernet network.

In such an example, a task on a first compute node may set (704) the bits assigned for each possible data communications algorithms to true or false to produce a bit pattern of '1101,' indicating that the task on the first compute node is capable of data communications over a point-to-point torus network, is capable of data communications over a global combining network, and is also capable of data communications over an Ethernet network. A task on a second compute node may set (704) the bits assigned for each possible data communications algorithms to true or false to produce a bit pattern of '0110,' indicating that the task on the second compute node is capable of data communications over a global combining network and also is capable of data communications using IP as a communications protocol. A task on a third compute node may set (704) the bits assigned for each possible data communications algorithms to true or false to produce a bit pattern of '1111,' indicating that the task on the third compute node is capable of data communications over a point-to-point torus network, is capable of data communications over a global combining network, is assigned to is capable of data communications using IP as a communications protocol, and is also capable of data communications over an Ethernet network.

In such an example, performing (706), by all the tasks, an allreduce operation with a bitwise AND produces result data of '0100,' indicating that all three tasks are capable of data communications over a global combining network. Identifying (610) the selected data communications algorithms of each task in a single collective operation therefore reveals that data communications between the three tasks should occur over a global combining network, as each task is capable of such communications.

In the example of FIG. 7, identifying (610), by each task to all other tasks, the selected data communications algorithms of each task in a single collective operation can alternatively include prioritizing (702) one or more of the selected data communications algorithms. In the example of FIG. 7, prioritizing (702) one or more of the selected data communications algorithms may be carried out, for example, by assigning a higher priority to a particular data communications algorithm such that the data communications algorithm with the highest priority is selected for use. Assigning a higher priority to a particular data communications algorithm may be carried out according to a predetermined priority order, in response to user feedback identifying a preferred data communications algorithm, in order to load balance among data communications algorithms, and so on.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of topology mapping in a distributed processing system, the distributed processing system including a plurality of compute nodes, each compute node executing a plurality of tasks, each task assigned a unique rank, the method comprising:

assigning each task to a geometry, wherein the geometry comprises a collection of compute nodes having distinct data communications abilities and resources available to tasks assigned to the geometry, wherein data communications abilities include one or more data communications algorithms supported by each compute nodes;

selecting, by each task from a list of possible data communications algorithms, one or more of the possible data communications algorithms supported by the compute node upon which the task is executing in the assigned geometry;

identifying, by each task, the selected data communications algorithms of all other tasks in a single collective operation, wherein the identification includes the steps of:

setting, by each task a string of bits where each bit represents a data communications algorithm available for the task being executed on the compute node, a bit to true for each algorithm selected by the task; and performing, by all the tasks, an allreduce operation with a bitwise AND of all string of bits associated with each task; and performing, by each task, communication with all other tasks using one or more data communication algorithms common to all tasks.

2. The method of claim 1 wherein identifying, by each task, the selected data communications algorithms of all other tasks further comprises prioritizing one or more of the selected data communications algorithms.

3. The method of claim 1 wherein a data communications algorithm is associated with a type of data communications network.

4. The method of claim 1 wherein a data communications algorithm comprises a data communications protocol.

* * * * *